(12) United States Patent
Morein

(10) Patent No.: US 9,020,012 B1
(45) Date of Patent: Apr. 28, 2015

(54) OVERSAMPLED RECEIVER FOR TRANSITION ENCODED SIGNALING

(71) Applicant: Synaptics Incorporated, San Jose, CA (US)

(72) Inventor: Stephen Morein, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 14/170,536

(22) Filed: Jan. 31, 2014

(51) Int. Cl.
*H04L 25/06* (2006.01)
*H04L 25/02* (2006.01)

(52) U.S. Cl.
CPC .......... *H04L 25/069* (2013.01); *H04L 25/0272* (2013.01); *H04L 25/0296* (2013.01)

(58) Field of Classification Search
CPC .... H04L 25/061; H04L 25/062; H04L 25/063
USPC .......... 375/319, 322, 326, 328; 348/725, 726
See application file for complete search history.

(56) References Cited

U.S. PATENT DOCUMENTS

| | | | |
|---|---|---|---|
| 6,556,628 B1 | 4/2003 | Poulton et al. | |
| 7,221,295 B2 * | 5/2007 | Carley | 341/101 |
| 7,571,340 B2 * | 8/2009 | Jiang | 713/500 |
| 8,634,941 B2 * | 1/2014 | Ploix | 700/73 |

OTHER PUBLICATIONS

Poulton, et al., "Multiwire Differential Signaling", Version 1.1, UHC-CH Department of Computer Science, Aug. 6, 2003, 20 pages.
Dally, et al., "Digital Systems Engineering", Cambridge University Press, Jun. 28, 1998, (pp. 447-450, 547, 548), 8 pages.

* cited by examiner

*Primary Examiner* — Khai Tran
(74) *Attorney, Agent, or Firm* — Osha Liang LLP

(57) ABSTRACT

A receiver includes a multiphase clock having multiple clock edges, the clock edges being time staggered for the multiphase clock. The receiver further includes circuitry configured to receive a multi-wire transitional coded signal, sample, at each clock edge of the multiphase clock, the multi-wire transitional coded signal to obtain a sample sequence, and output a symbol for each transition in the sample sequence to obtain an output receiver sequence. The number of clock edges is greater than the number of symbols.

20 Claims, 9 Drawing Sheets

OVERSAMPLED RECEIVER FOR TRANSITION ENCODED SIGNALING

FIELD OF THE INVENTION

This invention generally relates to electronic devices.

BACKGROUND

Devices often include multiple circuits that perform various operations of the device. Each circuit may be connected to at least one other circuit of the device and/or to an external circuit that is external of the device. The connection provides a channel for sending signals between the circuits. The interconnection allows the functionality of the device to be achieved.

SUMMARY

In general, in one aspect, embodiments relate to a receiver that includes a multiphase clock having multiple clock edges, the clock edges being time staggered for the multiphase clock. The receiver further includes circuitry configured to receive a multi-wire transitional coded signal, sample, at each clock edge of the multiphase clock, the multi-wire transitional coded signal to obtain a sample sequence, and output a symbol for each transition in the sample sequence to obtain an output receiver sequence. The number of clock edges is greater than the number of symbols.

In general, in one aspect, embodiments relate to a method that includes receiving a multi-wire transitional coded signal, sampling, at each clock edge of a multiphase clock having multiple clock edges, the multi-wire transitional coded signal to obtain a sample sequence, and output a symbol for each transition in the sample sequence to obtain an output receiver sequence. The multiple clock edges are time staggered for the multiphase clock, and the number of clock edges is greater than the number of symbols.

In general, in one aspect, embodiments relate to a device that includes a multiphase clock having multiple clock edges, the multiple clock edges being time staggered for the multiphase clock. The device further includes a processing system configured to receive a multi-wire transitional coded signal, sample, at each clock edge of the multiphase clock, the multi-wire transitional coded signal to obtain a sample sequence, and output a symbol for each transition in the sample sequence to obtain an output device sequence. The number of clock edges is greater than the number of symbols.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and.

DETAILED DESCRIPTION

Figure 1:
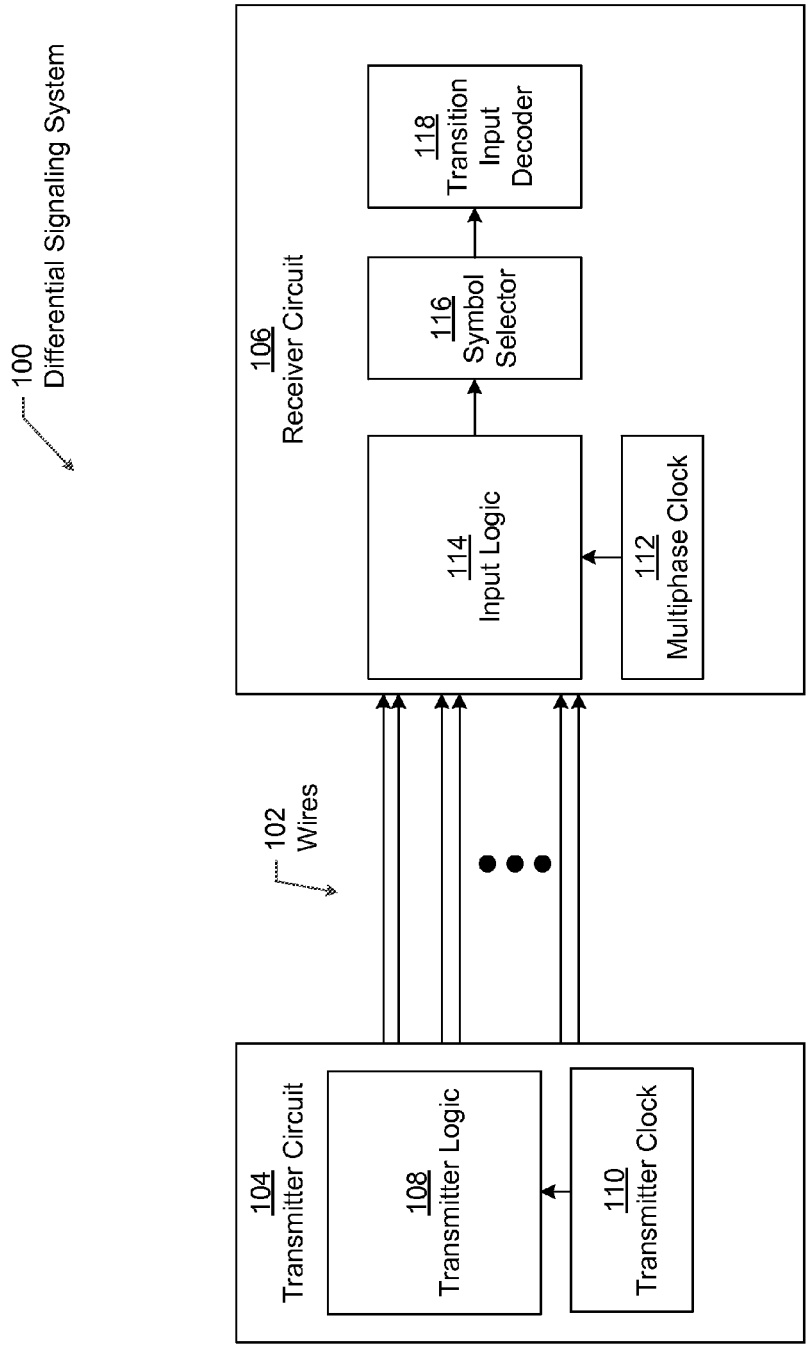
FIGS. 1 and 2 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention are directed to processing an input signal in a differential signaling system. Specifically, a receiver circuit receives a multi-wire transitional coded signal from a transmitter circuit. The receiver circuit samples the multi-wire transitional coded signal according to the clock edges of a multiphase clock to obtain a signal sequence. The signal sequence is decoded based on transitions between symbols in the signal sequence to obtain an output receiver sequence.

FIG. 1 shows a schematic diagram of a differential signaling system (100) in accordance with one or more embodiments of the invention. One or more of the components of FIG. 1 may be implemented in a device, such as any piece of hardware equipment or component of hardware equipment. For example, a device may be a liquid crystal display, a liquid electrode display, a camera, or another piece of hardware equipment.

The differential signaling system (100) is a system of transmitting and receiving signals on wires (102), whereby each wire transmits at a defined level for a unit of time. The level may be defined by voltage level, current level, or other mechanism. In a differential signaling system (100), information is encoded based on relative level of each wire in each set of three wires. Specifically, each wire in the set may have a value of high level, neutral level, or negative level, where no two wires are in the same level. Thus, the first wire may be in one of three different levels, the second wire may be in one of the two remaining levels, and the third wire may be in only the last level. Which wire is in which level encodes a particular state. For example, a first state is specified by having a first wire in high level, a second wire in neutral level, and a third wire in negative level, whereas a second value is specified with the first wire in high level, the second wire in negative level, and the third wire in neutral level. Further, three sets of three wires may be combined to encode additional values. Specifically, a fourth value may be specified when the first set of wires has a higher level than a second set of wires, which has a higher level than a third set of wires. The triple combinations may continue based on sets of sets of sets and so forth.

The combination of values at a particular time encodes a symbol in one or more embodiments of the invention. In other words, a symbol is defined by the combination of the values specified by which wires are in the high level, neutral level, or negative level relative to other wires in the set. For any particular time, a symbol may be in one of a number of different possible states defined by the number of sets of wires.

Further, in one or more embodiments of the invention, a sample sequence, or the sequence created by sampling symbols, may be transition encoded. Transition encoding refers to encoding based on the transition between states of two neighboring symbols. Specifically, if n is the number of possible states, each state may transition to n−1 other states. For example, if there are 6 possible states (e.g., states A, B, C, D, E, F) and the preceding symbol is in state A, the current symbol may be in one of states B, C, D, E, or F. A transition between state A of the preceding symbol to state C of the current symbol may be encoded as decoded state X in the output receiver sequence. In general, for n possible encoded states, n−1 possible decoded states exist.

As shown in FIG. 1, the differential signaling system (100) includes a transmitter circuit (104), and a receiver circuit (106), and wires (102) connecting the transmitter circuit (104) to the receiver circuit (106). Each of these components is discussed below.

The transmitter circuit (104) is a hardware circuit that includes functionality to transmit a signal in one or more embodiments of the invention. The transmitter circuit (104) includes transmitter logic (108) and a transmitter clock (110). The transmitter logic (108) is hardware logic that includes functionality to encode symbols into a signal for each wire and transmitting the signal on the wires (102).

In one or more embodiments of the invention, the transmitter logic (108) is connected to a transmitter clock (110). The transmitter clock (110) corresponds to a hardware clock that transmits a regular pattern signal to the transmitter logic (108). The regular pattern signal has a periodic high state, a periodic low state, and a regularly occurring clock edge. The clock edge is a transition from a low state to a high state. The clock edge defines to the transmitter logic (108) when to switch to transmitting a different symbol on the wires (102).

Continuing with FIG. 1, a receiver circuit (106) is a hardware circuit that includes functionality to receive and decode an input signal (i.e., a signal from wires (102)). The receiver circuit (106) includes a multiphase clock (112), input logic (114), a symbol selector (116), and a transition input decoder (118) in accordance with one or more embodiments of the invention.

The multiphase clock (112) is a hardware clock that includes multiple phases. Each phase of the multiphase clock generates a regular pattern signal to the input logic (114). The regular pattern signal has a periodic high state, a periodic low state, and a regularly occurring clock edge. The clock edge is a transition from a low state to a high state. The clock edge defines to the input logic (114) when to sample the signal on the wires (102). Further, each phase of the multiphase clock is a time staggered from other phases of the multiphase clock. In other words, clock edges for each phase occur at the same regular interval. However, clock edges of different phases do not occur at the same time, but rather at staggered times. In one or more embodiments of the invention, the multiphase clock (112) is not synchronized with the transmitter clock (110).

In one or more embodiments of the invention, the input logic (114) includes functionality to sample the wires (102) at the clock edge of the multiphase clock and generate a sample in accordance with one or more embodiments of the invention. The input logic (114) may include a single sampler (not shown) or multiple samplers (not shown). A sampler is the hardware logic that is configured to perform single sampling of the input wires for each unit of time. Multiple samplers may exist, for example, where multiple samples are taken simultaneously and/or concurrently. In one or more embodiments of the invention, the output of the input logic (114) is a sample sequence specifying various symbols.

In one or more embodiments of the invention, the input logic (114) is connected to a symbol selector (116). The symbol selector (116) includes functionality to detect and remove bad symbols from the sample sequence. Bad symbols are symbols that are recorded as an incorrect state. In other words, whereas the transmitter transmitted a first state as the symbol, the input logic detected a second state. Bad symbols may exist, for example, when a sample is taken as the signal on the wire is transitioning from one state to another state. For example, if a wire is transitioning from a high level to a negative level, the input logic may incorrectly sample a neutral level.

In one or more embodiments of the invention, the transition input decoder (118) is hardware logic that includes functionality to receive a sample sequence, decode the sample sequence based on transitions between consecutive symbols to obtain a decoded symbol for each transition, and add the decoded symbol to an output receiver sequence.

While FIG. 1 shows a configuration of components, other configurations may be used without departing from the scope of the invention. For example, various components may be combined to create a single component. As another example, the functionality performed by a single component may be performed by two or more components.

Figure 2:
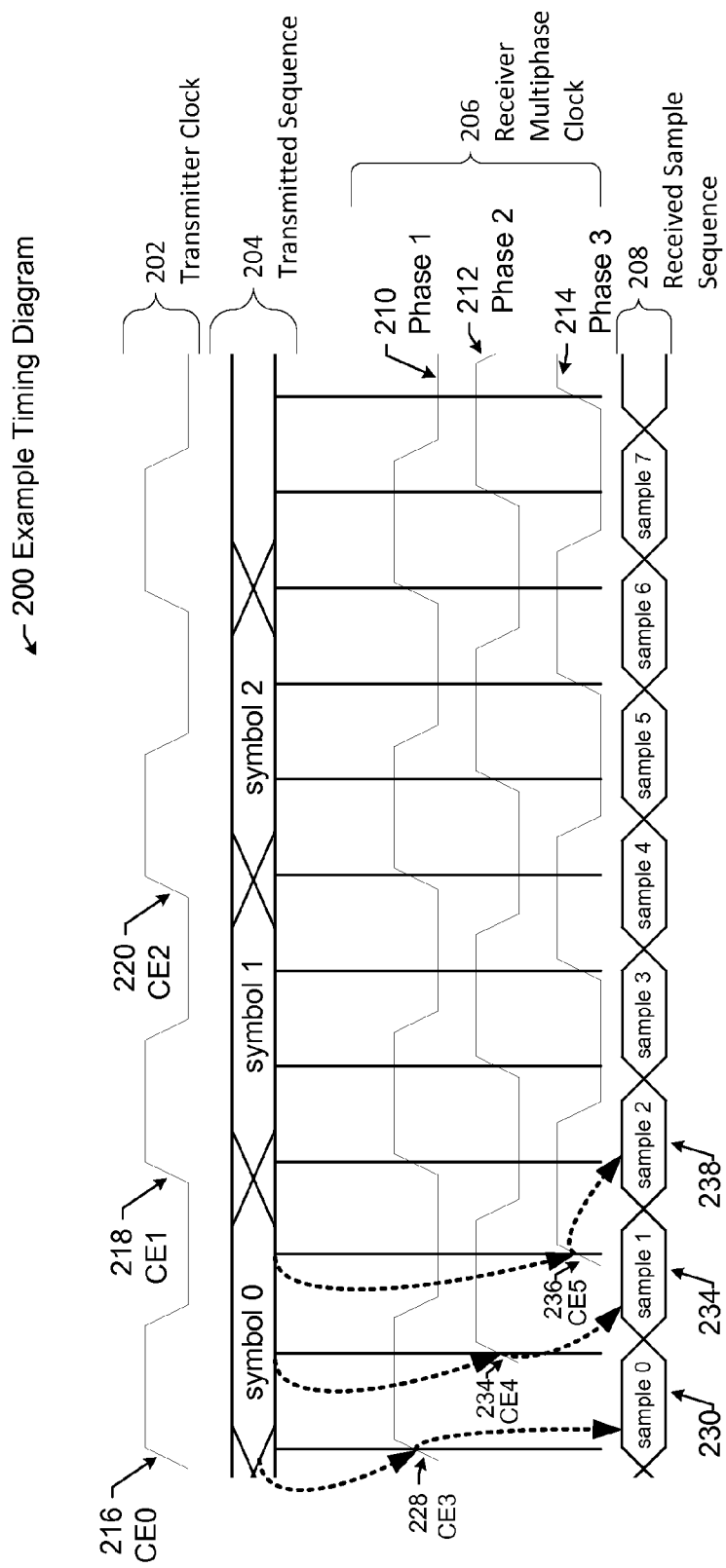

FIG. 2 shows an example timing diagram (200) in accordance with one or more embodiments of the invention. The example timing diagram (200) shows timelines for the transmitter clock (202), the transmitted sequence (204), three phases (e.g., phase 1 (210), phase 2 (212), phase 3 (214)) of the multiphase clock (206), and the received sample sequence (208). In the example timing diagram (200), events that are vertically aligned on different timelines occur at the same time within a margin of error to account for transmission time.

As shown in FIG. 2, with each clock edge of the transmitter clock (202), the transmitted sequence (202) transitions to transmitting a new symbol. In the example, at clock edge 0 (CE0 (216)) of the transmitter clock (202), the transmitter transmits symbol 0 (222). The transmitter transitions to transmitting symbol 1 (224) at clock edge 1 (CE1 (218)) of the transmitter clock (202) and to transmitting symbol 2 (226) at clock edge 2 (CE2 (220)) of the transmitter clock (202).

One or more samplers on the receiver sample the transmitted sequence (204) according to the phases of the multiphase clock (206). In the example, at clock edge 3 (CE3 (228)) of phase 1 (210) of the multiphase clock (206), the transmitted sequence (204) is sampled, as shown by the dotted arrows in FIG. 2, to obtain sample 0 (230). Because the transmitted sequence (204) is in transition to symbol 0 (222) at the time of clock edge 3 (CE3 (222)), sample 0 may or may not be a bad symbol. In other words, sample 0 (230) may or may not correctly reflect symbol 0 (222). A single sampler or multiple samplers may sample the transmitted sequence (204) at each clock edge. If multiple samplers sample the transmitted sequence, a voting scheme or other scheme may be used to select sample 0 (230) from the set of samples obtained by the multiple samplers.

At clock edge 4 (CE4 (232)) of phase 2 (212) of the multiphase clock (206), the transmitted sequence (204) is sampled to obtain sample 1 (232). Because the transmitted sequence (204) is in the middle of transmitting symbol 0 (222), sample 1 (234) most likely reflects a correct state of symbol 0 (222). However, because the transmitter clock (202) and the multiphase clock are not synchronized in accordance with one or more embodiments of the invention, whether sample 1 is a bad sample or a correct sample may not be apparent based purely on sample 1.

At clock edge 5 (CE4 (236)) of phase 3 (214) of the multiphase clock (206), the transmitted sequence (204) is sampled to obtain sample 2 (238). Because the transmitted sequence (204) is in the middle of transmitting symbol 0 (222), sample 2 (238) also most likely reflects a correct state of symbol 0 (222).

In one or more embodiments of the invention, the same set of one or more samplers are used for each phase of the multiphase clock. Alternatively, in one or more embodiments of the invention, different samplers are used for each phase of the multiphase clock. For example, a first set of one or more samplers may be used for a first phase, a second set of one or more samplers may be used for a second phase, and a third set of one or more samplers may be used for the third phase.

Further, the process of taking samples may repeat with each clock edge of each phase of the multiphase clock (206). Thus, the different phases of the multiphase clock trigger samples to be taken of the transmitted sequence (204). Further, as shown by FIG. 2, the number of clock edges of the multiphase clock (206), and, subsequently, the number of samples are both greater than the number of symbols in the transmitted symbol sequence.

Although FIG. 2 only shows three phases of the multiphase clock, the multiphase clock may have two phases or more than three phases without departing from the scope of the invention.

FIGS. 3-7 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 3:
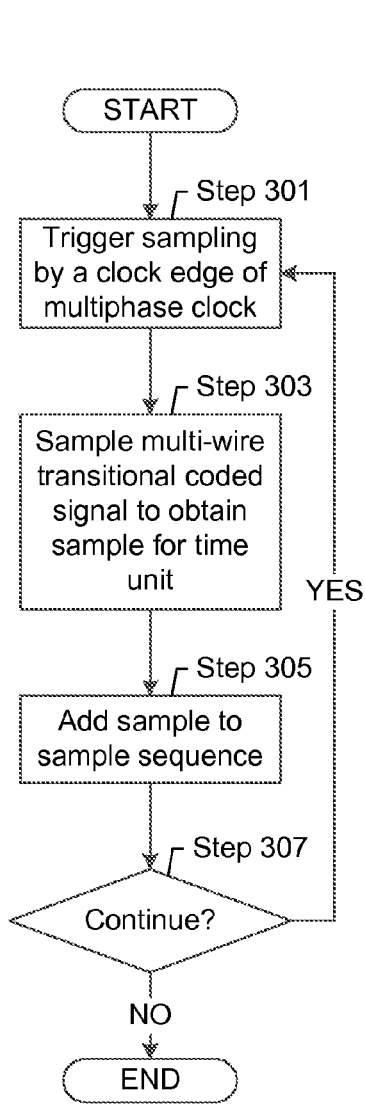
FIGS. 3-7 show flowcharts in accordance with one or more embodiments of the invention.

FIG. 3 shows a flowchart for sampling a transmitted sequence in accordance with one or more embodiments of the invention. In Step 301, sampling is triggered by a clock edge of the multiphase clock. Based on the triggering, in Step 303, the multi-wire transitional coded signal is sampled to obtain a sample for a time unit. Sampling the multi-wire transitional coded signal is to obtain the relative voltage, current, or other measurement with respect to each wire or set of wire in a triple set of wires. In other words, for each triple set of wires, which wire is positive, which wire is neutral, and which wire is negative with respect to the other wires are identified. The combination of the relative values is a measured state for a sample for the unit of time in which the sample is taken.

In Step 305, the sample is added to the sample sequence in accordance with one or more embodiments of the invention. In other words, the sample may be transmitted to the bad symbol detector and/or decoder as part of the sample sequence.

In Step 307, a determination is made whether to continue sampling the multi-wire transitional coded signal in one or more embodiments of the invention. In particular, if the multiphase clock continues to operate, then the multi-wire transitional coded signal may continue to be sampled.

As discussed above, the output of FIG. 3 is a sample sequence having samples, where each sample is a particular symbol. The sample sequence is transition encoded. In other words, the transition between symbols is the transmitted information.

Figure 4:
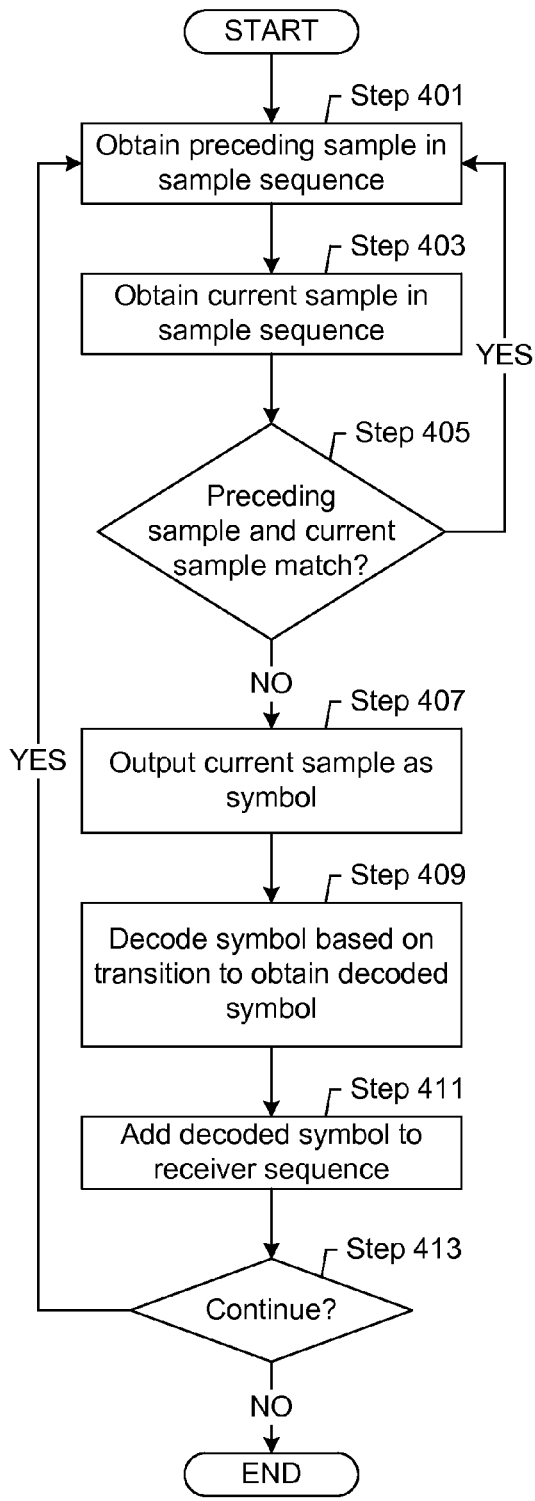

FIG. 4 shows a flowchart for decoding a sample sequence to obtain a receiver sequence in accordance with one or more embodiments of the invention. In Step 401, a preceding sample in the sample sequence is obtained in accordance with one or more embodiments of the invention. Specifically, the preceding sample in the sample sequence is identified. The preceding sample is the sample that is immediately next to the current sample. In Step 403, a current sample in the sample sequence is obtained in accordance with one or more embodiments of the invention. The current sample is obtained from the bad symbol detector or input logic.

In Step 405, a determination is made whether the preceding sample matches the current sample in accordance with one or more embodiments of the invention. If the current sample and the preceding sample match, then no transition has occurred. Thus, the method repeats with Step 401. When the method repeats, the current sample becomes the preceding sample and the next sample received is the current sample.

Alternatively, if the preceding sample does not match the current sample, then a transition has occurred. Accordingly, in Step 407, the current sample is output as a current symbol in accordance with one or more embodiments of the invention. Outputting the current sample as the symbol is to send the current sample to the next portion of the decoder in one or more embodiments of the invention. As a result of output the current sample as a symbol, the sample sequence includes nonmatching symbols next to each other.

In Step 411, the symbol is decoded based on the transition to obtain a decoded symbol in accordance with one or more embodiments of the invention. Specifically, the preceding symbol and the current symbol in the sample sequence are identified. The transition from the preceding symbol to the current symbol is mapped in the transition input decoder to an output symbol. The mappings that are used by the transmitter circuit are the same as the mappings using by the transition input decoder in the receiver circuit in accordance with one or more embodiments of the invention. For example, a transition from symbol 0 to symbol 1 may be decoded to output symbol 2 while a transition from symbol 0 to symbol 2 may be decoded to output symbol 3. Other transition encodings may be used without departing from the scope of the invention.

In Step 413, the decoded symbol is added to the receiver sequence in accordance with one or more embodiments of the invention. In other words, the decoded symbol is output from the receiver circuit as received information. Additional processing of the decoded symbol may be performed without departing from the scope of the invention.

Prior to or as a part of decoding the sample sequence based on transitions, bad symbols may be removed from the sample sequence. In order to remove bad symbols, different techniques may be used to detect bad symbols.

Figure 5:
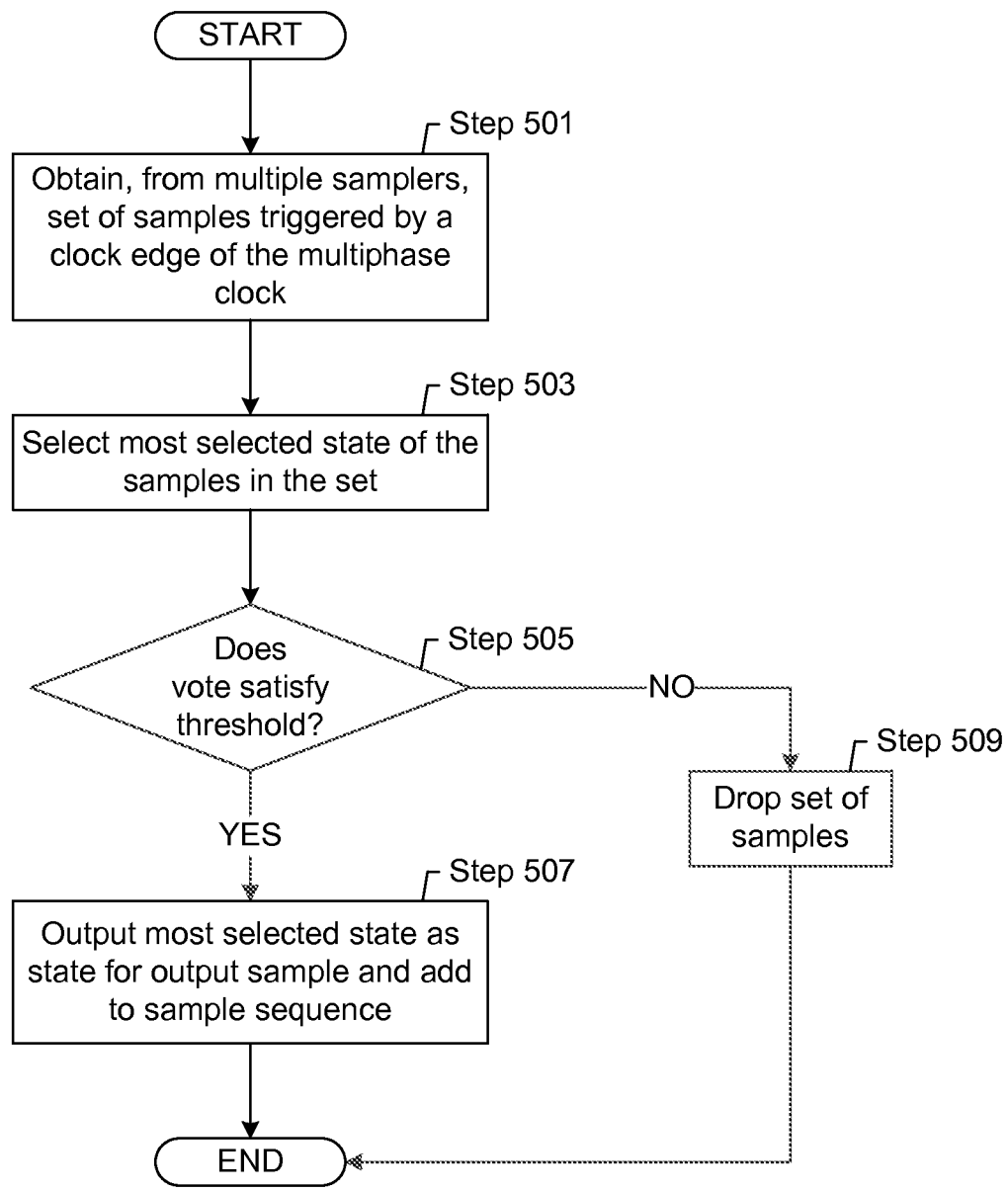

FIG. 5 shows a flowchart for detecting bad symbols in accordance with one or more embodiments of the invention. Specifically, FIG. 5 shows a flowchart for bad symbol detection using voting. The various steps of FIG. 5 may replace Steps 303 and 305 of FIG. 3 in accordance with one or more embodiments of the invention. In Step 501, a set of samples triggered by a clock edge of the multiphase clock are obtained by multiple samplers. In particular, a single clock edge of the multiphase clock triggers multiple samplers to sample the incoming signal. Each sampler obtains a sample having a particular state.

In Step 503, the most selected state of the samples in the set is selected in accordance with one or more embodiments of the invention. Specifically, the state of the samples that is selected by the multiple samplers is selected as the representative state for the sample.

In Step 505, a determination is made whether the vote satisfies a threshold in accordance with one or more embodiments of the invention. In one or more embodiments of the invention, the vote satisfies a threshold when at least the threshold number of samplers selected the state. Specifically, the determination is made whether the outcome of the vote has a clear winner.

In Step 507, if the vote satisfies a threshold, the most selected state is output as the state for the sample sequence in accordance with one or more embodiments of the invention. In other words, the most selected state is added as the sample to the sample sequence.

In Step 509, if the vote does not satisfy the threshold, then the set of samples are dropped in accordance with one or more embodiments of the invention. In other words, the set of samples are ignored.

Figure 6:
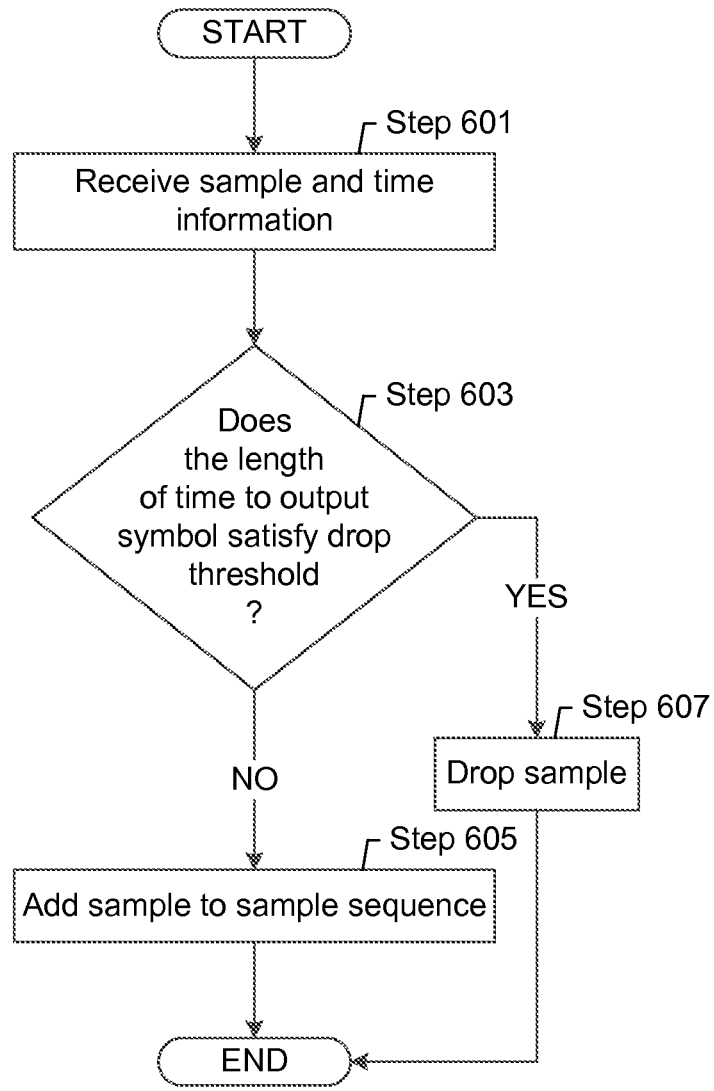

Additional or alternative techniques may be performed for bad symbol detection. FIG. 6 shows a flowchart for detecting bad symbols in accordance with one or more embodiments of the invention. Specifically, FIG. 6 shows a flowchart for bad symbol detection based on a time to obtain the symbol. The various steps of FIG. 6 may replace Steps 303 and 305 of FIG. 3 in accordance with one or more embodiments of the invention. Further, if the Steps of both FIG. 5 and FIG. 6 are performed, then Step 507 and 603 are the same Step.

In Step 601, a sample and time information is received. The time information may be received from any sampler and timing decision circuit. Examples of samplers and timing decision circuits may include sense amplifier flip flop and cross coupled latch. Specifically, the sample samples the incoming sequence. Rather than instantaneously selecting the state for the sample, the sampler may take a length of time to select the state for the sample depending on how close the signal is between different states. For example, if the state is clear from the incoming signal, then the length of time may be brief. If the state is not clear, such as if the incoming sequence is transitioning between symbols at the time of the detection, then the length of time may be longer as the sampler decides on the state. The time information is the length of time that the sampler takes to select the state for the symbol. The time information may be received from the timing decision circuit or calculated, such as the difference in time between the time in which the preceding state is selected and the current state is selected or the difference in time between the time in which the clock edge occurs and the sampler provides the state for the sample.

In Step 603, a determination is made whether the length of time to output the symbol satisfies a drop threshold in accordance with one or more embodiments of the invention. In Step 605, if the length of time satisfies the drop threshold, then the sample is dropped. In other words, the determination is made that the sense amplifier flip flop required too much time to detect the state indicating that the state is uncertain. Thus, the sample is dropped and not added to the sample sequence.

In Step 607, if the length of time does not satisfy the drop threshold, then the sample is added to the sample sequence. Specifically, the sample is considered valid and, therefore, appended to the sample sequence.

Figure 7:
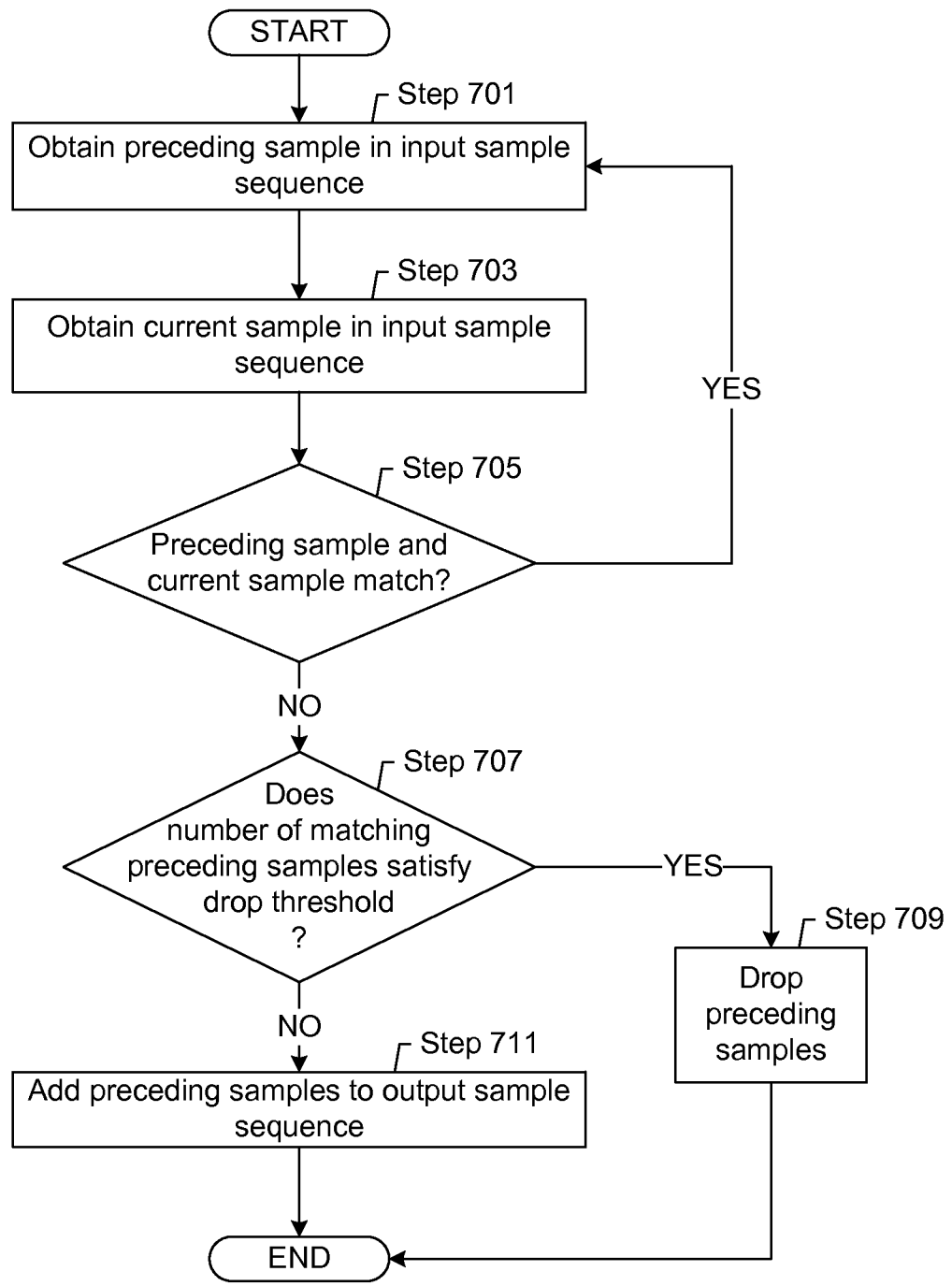

Additional or alternative techniques may be performed for bad symbol detection. FIG. 7 shows a flowchart for detecting bad symbols in accordance with one or more embodiments of the invention. Specifically, FIG. 7 shows a flowchart for dropping sequences of symbols having the same state that are too short. Specifically, because the multiphase clock indicates triggers multiple sampling of the transmitted sequence while the same symbol is being transmitted, the multiple consecutive samples should have the same state (i.e., the state of the transmitted symbol). If multiple consecutive symbols do not have a same state, then one or more of the multiple consecutive symbols may be improperly detected. The various steps of FIG. 7 may be performed between performing FIG. 3 and performing FIG. 4 in accordance with one or more embodiments of the invention. In particular, the output of FIG. 3 may be the input to FIG. 7 and the output of FIG. 7 may be the input to FIG. 4 in accordance with one or more embodiments of the invention.

In Step 701, a preceding sample in the input sample sequence is obtained in accordance with one or more embodiments of the invention. Specifically, the preceding sample in the input sample sequence is identified. The preceding sample is the sample that is immediately next to the current sample.

In Step 703, a current sample in the input sample sequence is obtained in accordance with one or more embodiments of the invention. The current sample is obtained from the input logic.

In Step 705, a determination is made whether the preceding sample matches the current sample in accordance with one or more embodiments of the invention. If the current sample and the preceding sample match, then no transition between states has occurred the current sequence is continuing. Thus, the method repeats with Step 701. When the method repeats, the current sample becomes the preceding sample and the next sample received is the current sample.

In Step 707, if the preceding sample and the current sample do not match, then a transition has occurred and a determination is made whether the number of matching preceding samples satisfies a drop threshold. In one or more embodiments, the number of preceding samples satisfies a drop threshold when the number of preceding symbols is below a minimum number indicating that the preceding samples are bad.

If the number of preceding samples satisfies the drop threshold, then the preceding samples are dropped in Step 709. In other words, the preceding samples are not added to the sample sequence or are removed from the sample sequence.

If the number of preceding samples does not satisfy the drop threshold, then the preceding samples are added to the sample sequence. A single preceding sample of the state may be added or all or part of the preceding consecutive samples having the same state may be added to the output sample sequence. Further, adding the preceding samples may be performed, for example, by not removing the preceding samples from the sample sequence.

Although shown separately, the steps of FIG. 7 may be separate or combined with FIG. 4. For example, Steps 701, 703, 705 in FIG. 7 may be performed as part of Steps 401, 403, and 405 in FIG. 4. Further, in FIG. 7, Steps 707 and 709 in FIG. 7 may be performed prior to decoding the transition between symbols.

The following example is for explanatory purposes only and not intended to limit the scope of the invention. FIGS. 8A, 8B, 8C, and 8D show example circuits in accordance with one or more embodiments of the invention. In FIGS. 8A, 8B, 8C, and 8D boxes that have dotted edges are not present in the circuit, but rather are used to refer to a grouping of components of the circuit. Further, FIGS. 8A, 8B, 8C, and 8D may be combined to form a single circuit. In some embodiments, FIGS. 8A, 8B, and either 8C or 8D are combined to form a single circuit. Other embodiments which have different circuitry may exist without departing from the scope of the invention. Further, the number of inputs, outputs, receivers, phases, and other components are only for example purposes and not intended to limit the scope of the invention.

Figure 8A:
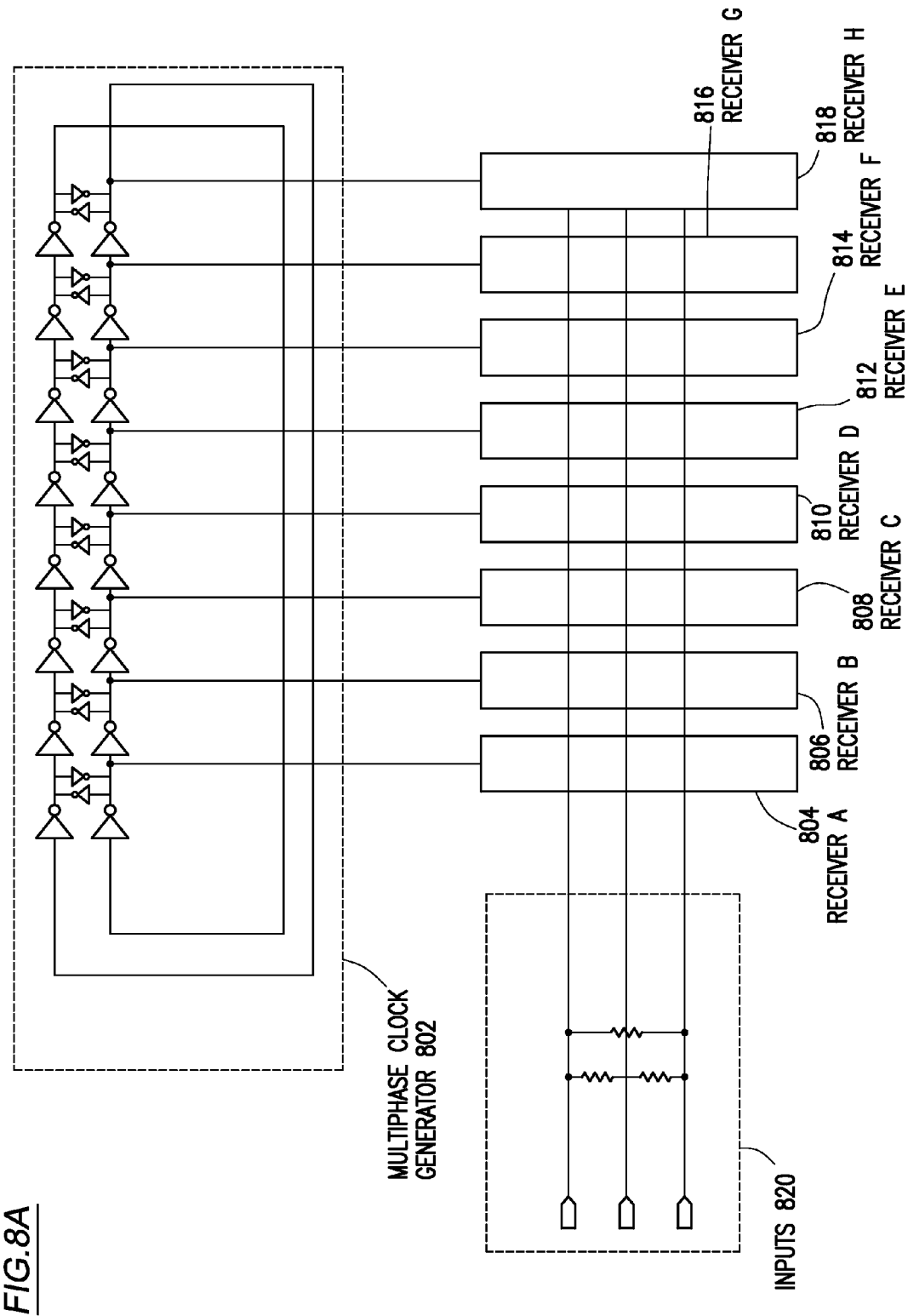
FIGS. 8A, 8B, 8C, and 8D show example circuits in accordance with one or more embodiments of the invention.

Turning to FIG. 8A, FIG. 8A shows an example circuit in accordance with one or more embodiments of the invention. As shown in FIG. 8A, a multiphase clock generator (802) connects to several receivers (e.g., receiver A (804), receiver B (806), receiver C (808), receiver D (810), receiver E (812), receiver F (814), receiver G (816), receiver H (818)). Specifically, each receiver is connected to the multiphase clock via a corresponding connection. Each connection corresponds to a separate and distinct phase of the multiphase clock. In other words, each receiver is triggered by the corresponding separate and distinct phase of the multiphase clock via the corresponding connection. Each receiver is also connected to three inputs (820) (e.g., input a, input b, input c). In other words, the inputs are the same to each receiver such that the receivers are aligned in parallel rather than in sequence with respect to the inputs. The multiphase clock triggers the receiver to sample the three inputs via the corresponding connection. Although not shown in FIG. 8A, the frequency of the multiphase clock may be controlled by a power supply control. Further, although not shown, the inputs and terminations may be amplified.

Figure 8B:
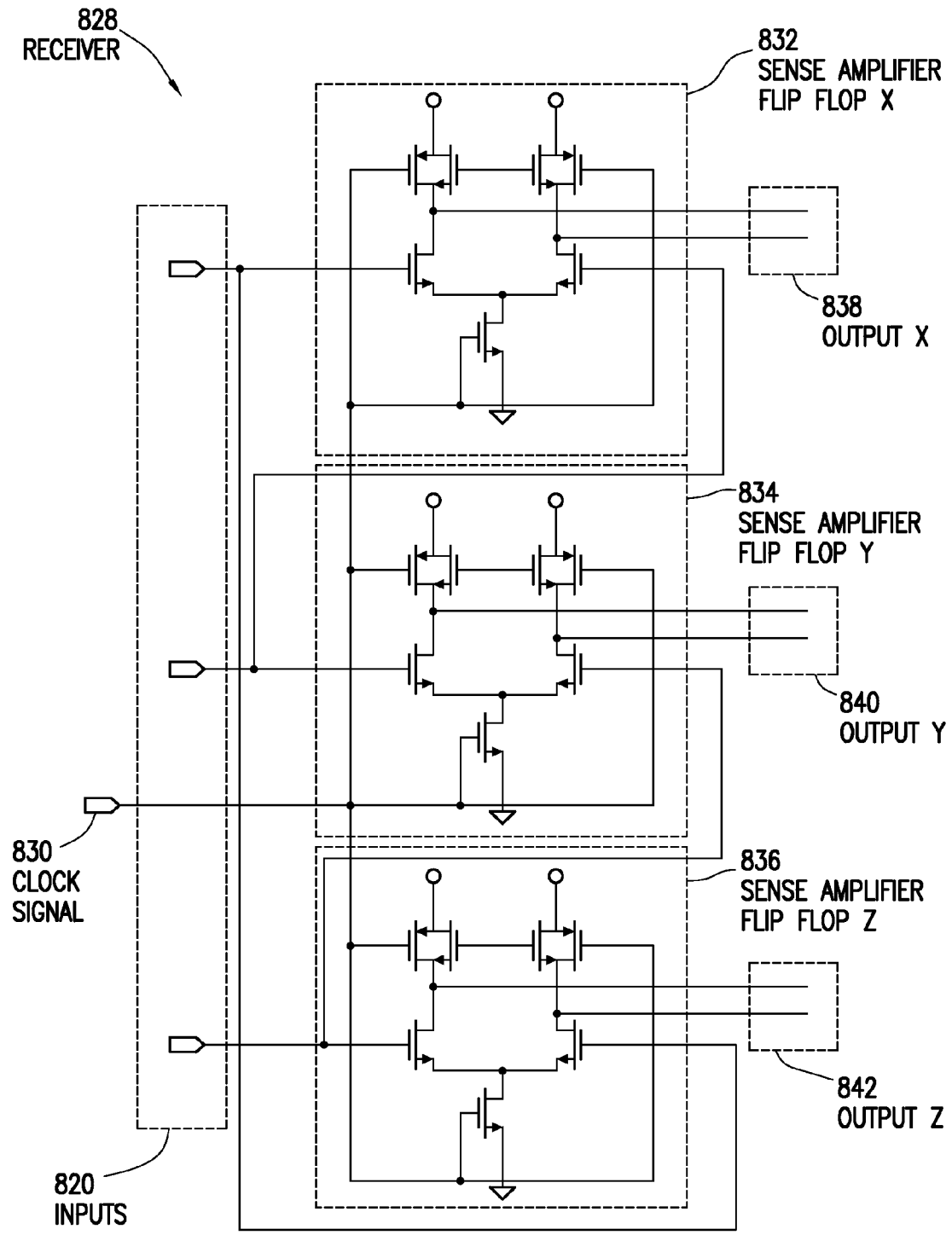

FIG. 8B shows an example circuit diagram of a receiver (828). The receiver may be one of the receivers of FIG. 8A in accordance with one or more embodiments of the invention. In other words, each receiver in FIG. 8A may correspond to the receiver (828) shown in FIG. 8B. In FIG. 8B, the clock signal (830) corresponds to the connection from the multiphase clock to the receiver in FIG. 8A. The inputs (820) shown in FIG. 8B are the same as the inputs shown in FIG. 8A. As shown in FIG. 8B, the inputs (820) are connected to three sense amplifier flip flops (e.g., sense amplifier flip flop X (832), sense amplifier flip flop Y (834), sense amplifier flip flop Z (836)). Although sense amplifier flip flops are described, cross coupled latches or other timing sampler decision circuits may be used. The receiver (828) is configured to obtain differential signaling samples based on the difference. In other words, sense amplifier flip flop X (832) obtains the difference between input a and input b to produce output X (838), sense amplifier flip flow Y (834) obtains the difference between input b and input c to produce output Y (840), and sense amplifier flip flow Z (836) obtains the difference between input a and input c to produce output Z (842).

Figure 8C:
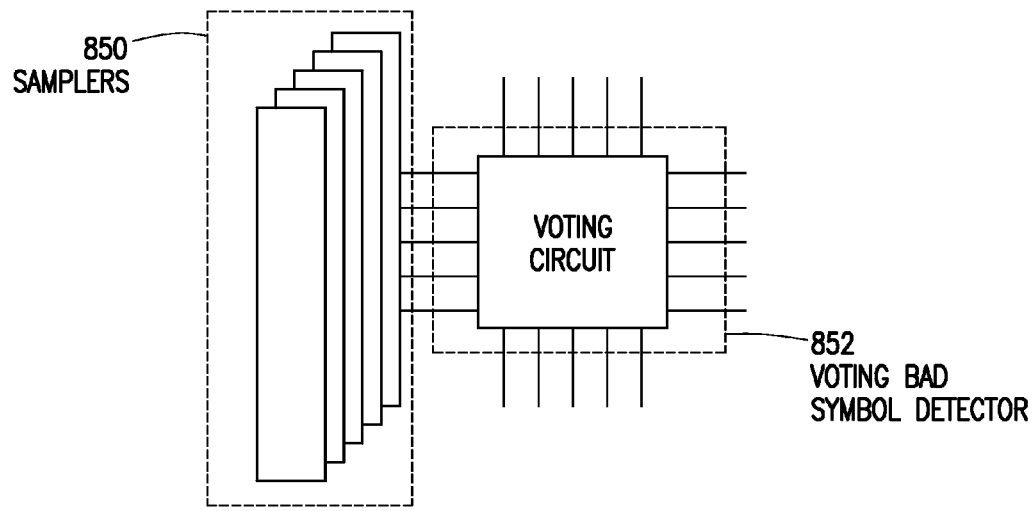

Bad symbol detection may be applied to the outputs to exclude which symbols in the sample sequence that are likely to correspond to bad symbols. FIG. 8C shows an example circuit diagram for bad symbol detection. As shown in FIG. 8C, multiple samplers (850) may be used to sample the input sequence. Each sampler (shown as a rectangular box in the samplers box (850)) may correspond to the receiver shown in FIG. 8B. However, all samplers may be triggered by the same phase of the multiphase clock. In other words, the diagram of FIG. 8C may replace one of the receivers of FIG. 8A. The set of samplers (850) are connected to a voting bad symbol detector (852) that is a voting circuit. The voting bad symbol detector (852) selects the symbol by the most number of samplers is selected as the output for the sample sequence in the example of FIG. 8C.

Figure 8D:
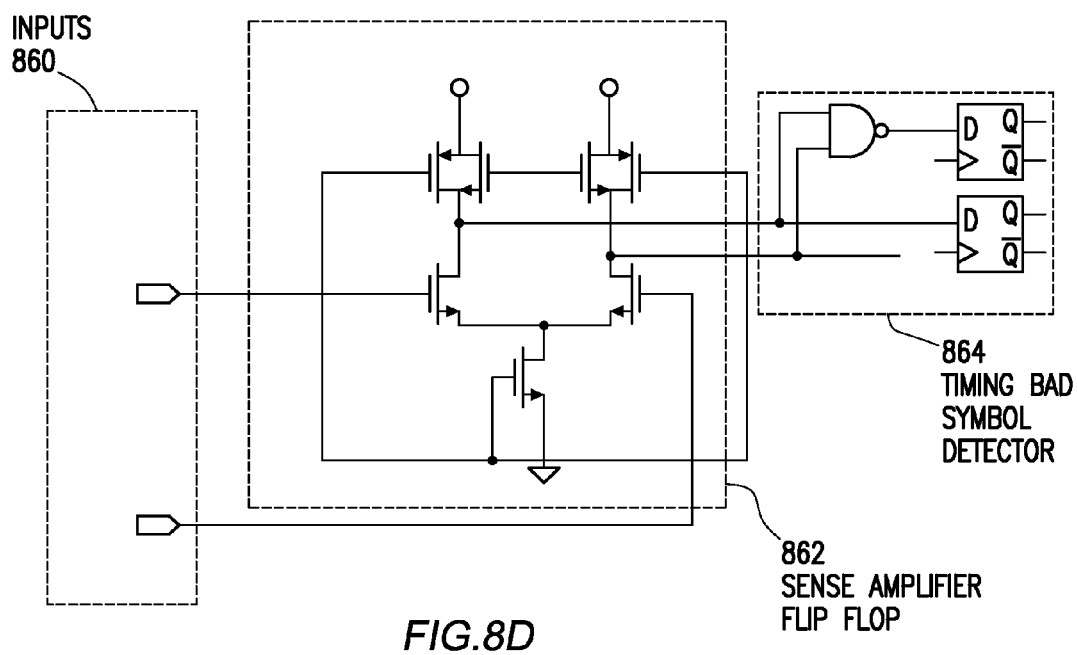

FIG. 8D shows another example circuit diagram in accordance with one or more embodiments of the invention. The inputs (860) in FIG. 8D correspond to two of the inputs in FIG. 8B. Further, the sense amplifier flip flop (862) in FIG. 8D corresponds to one of the sense amplifier flip flops in FIG. 8B. As shown in FIG. 8D, the output of the sense amplifier flip flop (862) is connected to a timing bad symbol detector (864). The timing bad symbol detector (864) determines how long the input takes to resolve to a value. In particular, if the result of the timing bad symbol detector (864) is zero, then the outputs of the sense amplifier flip flop (862) are both high and the sense amplifier flip flop (862) has not resolved to a value. Thus, the outputs are ignored. Alternatively, if the result of the timing bad symbol detector (864) is one, then the outputs of the sense amplifier flip flop (862) had one high and one low, and the sense amplifier flip flop (862) resolved to a value. Thus, the outputs are added to the sample sequence.

By using a multiphase clock, one or more embodiments of the invention allow for a slower clock to be used to oversample the incoming signal while saving in the power consumption. Further, by performing multi-wire differential signaling with transition encoding, more symbol states may be captured while accurately identifying the incoming symbols.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A receiver comprising:
   a multiphase clock having a plurality of clock edges, the plurality of clock edges being time staggered for the multiphase clock; and
   circuitry configured to:
   receive a multi-wire transitional coded signal,
   sample, at each clock edge of the multiphase clock, the multi-wire transitional coded signal to obtain a sample sequence, and
   output a symbol for each transition in the sample sequence to obtain an output receiver sequence,
   wherein a number of clock edges is greater than the number of symbols.

2. The receiver of claim 1, wherein the circuitry is further configured to:
   detect bad symbols in the sample sequence.

3. The receiver of claim 2, wherein sampling the multi-wire transitional coded signal comprises:
   obtaining a sequential set of matching symbols triggered by a clock edge of the multi-phase clock, and
   wherein detecting bad symbols comprises:
   dropping the sequential set of matching symbols when a number of the sequential set of matching symbols satisfies a drop threshold.

4. The receiver of claim 2, wherein detecting bad symbols comprises:
   dropping a sample when a length of time to sample the multi-wire transitional coded signal and obtain the sample satisfies a drop threshold.

5. The receiver of claim 2, wherein sampling at a clock edge of the multiphase clock comprises:
   sampling, by multiple samplers, the multi-wire transitional coded signal to obtain a plurality of symbols for the clock edge,
   wherein detecting bad symbols comprises:
   using a voting scheme to determine whether the plurality of symbols is valid.

6. The receiver of claim 5, wherein using the voting scheme comprises selecting a highest frequency symbol from the plurality of symbols to add to the sample sequence.

7. The receiver of claim 6, wherein the highest frequency symbol is selected when a frequency of the highest frequency symbol satisfies a keep threshold.

8. A method comprising:
   receiving a multi-wire transitional coded signal;
   sampling, at each clock edge of a multiphase clock having a plurality of clock edges, the multi-wire transitional coded signal to obtain a sample sequence, wherein the plurality of clock edges are time staggered for the multiphase clock; and output a symbol for each transition in the sample sequence to obtain an output receiver sequence,
wherein a number of clock edges is greater than the number of symbols.

9. The method of claim 8, further comprising:
detecting bad symbols in the sample sequence.

10. The method of claim 9, wherein sampling the multi-wire transitional coded signal comprises:
obtaining a sequential set of matching symbols triggered by a clock edge of the multi-phase clock, and
wherein detecting bad symbols comprises:
dropping the sequential set of matching symbols when a number of the sequential set of matching symbols satisfies a drop threshold.

11. The method of claim 9, wherein detecting bad symbols comprises:
dropping a sample when a length of time to sample the multi-wire transitional coded signal and obtain the sample satisfies a drop threshold.

12. The method of claim 9, wherein sampling at a clock edge of the multiphase clock comprises:
sampling, by multiple samplers, the multi-wire transitional coded signal to obtain a plurality of symbols for the clock edge,
wherein detecting bad symbols comprises:
using a voting scheme to determine whether the plurality of symbols is valid.

13. The method of claim 12, wherein using the voting scheme comprises selecting a highest frequency symbol from the plurality of symbols to add to the sample sequence.

14. The method of claim 13, wherein the highest frequency symbol is selected when a frequency of the highest frequency symbol satisfies a keep threshold.

15. A device comprising:
a multiphase clock having a plurality of clock edges, the plurality of clock edges being time staggered for the multiphase clock; and
a processing system configured to:
receive a multi-wire transitional coded signal,
sample, at each clock edge of the multiphase clock, the multi-wire transitional coded signal to obtain a sample sequence, and
output a symbol for each transition in the sample sequence to obtain an output device sequence,
wherein a number of clock edges is greater than the number of symbols.

16. The device of claim 15, wherein the processing system is further configured to:
detect bad symbols in the sample sequence.

17. The device of claim 16, wherein sampling the multi-wire transitional coded signal comprises:
obtaining a sequential set of matching symbols triggered by a clock edge of the multi-phase clock, and
wherein detecting bad symbols comprises:
dropping the sequential set of matching symbols when a number of the sequential set of matching symbols satisfies a drop threshold.

18. The device of claim 16, wherein detecting bad symbols comprises:
dropping a sample when a length of time to sample the multi-wire transitional coded signal and obtain the sample satisfies a drop threshold.

19. The device of claim 16, wherein sampling at a clock edge of the multiphase clock comprises:
sampling, by multiple samplers, the multi-wire transitional coded signal to obtain a plurality of symbols for the clock edge,
wherein detecting bad symbols comprises:
using a voting scheme to determine whether the plurality of symbols is valid.

20. The device of claim 19, wherein using the voting scheme comprises selecting a highest frequency symbol from the plurality of symbols to add to the sample sequence.

* * * * *